United States Patent [19]
Badiqué

[11] Patent Number: 5,570,434
[45] Date of Patent: Oct. 29, 1996

[54] CIRCUIT ARRANGEMENT FOR RECOGNIZING A HUMAN FACE

[75] Inventor: Eric Badiqué, Nürnberg, Germany

[73] Assignee: U.S. Philips Corporation, New York, N.Y.

[21] Appl. No.: 202,843

[22] Filed: Feb. 25, 1994

Related U.S. Application Data

[63] Continuation of Ser. No. 754,879, Sep. 4, 1991, abandoned.

[30] Foreign Application Priority Data

Sep. 5, 1990 [DE] Germany .......................... 40 28 191.4

[51] Int. Cl.⁶ ................................................. G06K 9/64
[52] U.S. Cl. ........................... 382/279; 382/288; 348/396
[58] Field of Search ...................... 382/1, 2, 56; 348/14, 348/19, 78, 390, 396

[56] References Cited

U.S. PATENT DOCUMENTS

| | | | |
|---|---|---|---|
| 4,692,806 | 9/1987 | Anderson et al. | 358/209 |
| 4,975,960 | 12/1990 | Petajan | 382/2 |
| 4,996,594 | 2/1991 | Murayama | 358/136 |
| 5,016,282 | 5/1991 | Tomono et al. | 382/2 |
| 5,086,480 | 2/1992 | Sexton | 382/56 |
| 5,136,659 | 8/1992 | Kaneko et al. | 382/2 |

FOREIGN PATENT DOCUMENTS 0330455  2/1989  European Pat. Off. .

OTHER PUBLICATIONS

E. Badiqué, "Knowledge-Based Facial Area Recognition and Improved Coding in a CCITT-Compatible Low-Bitrate Video-Codec", Picture Coding Symposium, Mar. 26-28, 1990, Cambridge, MA.

*Primary Examiner*—Leo Boudreau
*Assistant Examiner*—Chris Kelley

[57] ABSTRACT

A circuit for recognizing a human face in a sequence of video is provided. The circuit includes a block structuring circuit in which the video is structured block-wise and wherein two consecutive frames are subtracted from one another. The circuit also includes a unit for block-wise post-processing the difference frames. The post-processing unit includes a comparator for determining the areas of the difference picture which may correspond to a moving object, a mapping unit for forming a status picture by mapping each block of the difference picture which corresponds to a moving object onto a binary "one", all other blocks being mapped to a binary "zero".

The status picture is transformed by a transforming unit into a unidimensional feature function. The unidimensional feature function is then fed to a convolution unit to determine whether the feature function could include a "head-shoulder" scene. If so a plurality of marking units, mark all points of the status picture located within a predetermined rectangle in which the "face" may be present. Each picture element within the predetermined area is then refined.

8 Claims, 4 Drawing Sheets

CIRCUIT ARRANGEMENT FOR RECOGNIZING A HUMAN FACE

This is a continuation of application Ser. No. 07/754,879, filed Sep. 4, 1991 now abandoned.

BACKGROUND OF THE INVENTION

The invention relates to a circuit arrangement for recognizing a human face in a sequence of video pictures comprising first means provided for structuring the video pictures block-wise and for subtracting corresponding blocks of two consecutive pictures one from the other, second means for post-processing of the difference pictures produced by the first means, and having further means and features mentioned in the precharacterizing part of claim 1.

The mode of operation of a circuit arrangement having these properties is disclosed in a lecture given during the Picture Coding Symposium on Mar. 26th to 28th, 1990 in Cambridge, Mass., U.S.A. (cf. Eric Badique: Knowledge-based Facial Area Recognition and Improved Coding in a CCITT-Compatible Low-Bitrate Video-Codec. Proceedings of Picture Coding Symposium 90, Cambridge, Mass.).

A comparable circuit arrangement is described in the EP-A2-0 330 455, which is also used in, for example, view telephones. The reason to use circuit arrangements of this type in view phones having a low transmission rate (for example 64 kbits/s) is that during a conversation the eyes of a speaker mainly observe the face and more specifically the eyes and the mouth of the other speaker and that this fact can be utilized to obtain a subjective improvement of the picture quality, without an increase in the transmission rate. Such an improvement is namely obtained when the eyes and mouth sections of a face are encoded, at the expense of other regions of the picture, with a higher accuracy,—i.e. with more bits—than other parts. Utilizing this effect is however only possible when it is known in advance whether a face can be present or not present in a sequence of video pictures.

The arrangement described in the EP-A2-0 330 455 utilizes for the said purpose the difference between two consecutive video pictures. Signal portions differing from zero appear only in the difference picture when the picture sequence includes moving objects. In the said Patent Application the sequence of difference pictures is post-processed in a manner which makes the possibility of recognition errors probable.

SUMMARY OF THE INVENTION

The invention has therefore for its object to provide a circuit arrangement of the type defined in the opening paragraph, in which the decision whether a sequence of video pictures includes a human face or not, is taken in a significantly more reliable manner than in the prior-art arrangement.

In a circuit arrangement of the type defined in the opening paragraph, this object is achieved by the combination of the following features:

transforming means provided for transforming the area or areas of the status picture having the first binary value into a unidimensional feature function in such a manner that the number of these status bits within a line or a column of the status picture is determined as a function of the number of lines or number of columns, convolution means provided for standardizing the feature function to convolute it with a sub-function which is provided such that the convolution integral with ideal samples of feature functions assumes a predetermined ideal value and only then supplies a recognition signal when the value of the current convolution integral corresponds to the ideal values within predetermined tolerance limits, marking means provided, when a recognition signal is present, for determining within each line the centre of gravity of the status bit having the first binary value, to use the totality of these centres of gravity to determine a vertical centre axis, and to mark all the points of the status picture which are located within a predetermined face area, which is cut in half by the centre axis and has the upper centre of gravity as its boundary point.

The determination of a face area in the status picture provides a coarse recognition of a human face. The reliable determination of a face area requires however the determination of a status picture which with the highest possible degree of probability represents a human head with shoulders.

To increase this probability still further a local filtering or a temporal smoothing, respectively, of the status picture is provided.

For the same purpose second filter means are further provided, by means of which the size of the associated areas appearing in the status picture are determined. If the largest area does not significantly differ from the second largest area, then in such a case an picture of a human face with shoulders will most probably not be present. This case is indicated by a relevant signal; all further measures for the recognition of a face are then omitted. After the determination of the face areas those picture elements are further examined that are located in the areas of a video picture, which consists of all the blocks, that form the face areas of the status picture. The further investigation is consequently limited to a fraction of the overall video picture and is consequently less expensive.

This part of the video picture is now divided into regions. These regions are related areas of the video picture, whose picture elements all belong to the same class of picture element data. Such a classification can, for example, be obtained by classifying all the prevailing grey values or all the prevailing chrominance values in sub-quantities which belong to the same class but are different from each other. A classification according to motion intensity is likewise possible.

The object of these measures is, to enable the recognition of the mouth and eyes of a human being within the investigated portions of the video picture. Also the centres of gravity of the determined areas are intended for this purpose. Thereafter the distances of always three centres of gravity (triplet) are determined and these distances and the position of the triplet are compared to reference data. A triplet which is, for example, located at the edge of the examined area, cannot correspond to the eye and the mouth of a human being; this is also not possible for a triplet whose distance ratios deviate significantly from 1. If a triplet has passed the test, then it is evaluated in accordance with a plurality of criteria, namely on the basis of the position of the triplet in relation to the vertical centre axis (geometrical criterion), the chrominance values of the regions and their environment (colour criterion) or which motion intensity (dynamic criterion) belongs to them.

If two consecutively determined triplets with the highest weighting factor agree within certain tolerance limits, the fact that a human face is present can be assumed with very great certainty. Then all the picture elements are determined in accordance with reference values that might belong to the face and—when utilized in a view phone—they are coded with greater accuracy then all the picture elements outside the face.

BRIEF DESCRIPTION OF THE INVENTION

The invention will now be described in greater detail with reference to the accompanying Figures and an embodiment.

Therein.

DETAILED DESCRIPTION OF PREFERRED EMBODIMENTS OF THE INVENTION

Figure 1:
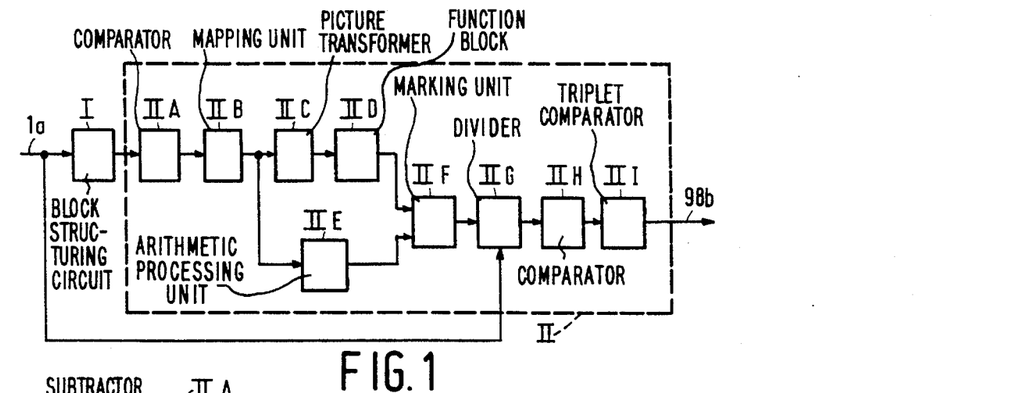
FIG. 1 is a basic circuit diagram of an arrangement having the features in accordance with the invention.

In the basic circuit diagram of FIG. 1 the video signal of a camera is applied via a line 1a to the circuit and is structured in blocks by a unit I, which blocks each consist of 8×8=64 picture elements. The picture element data consist of luminance data, symbolized by Y, and chrominance data, symbolized by U and V. The complete picture comprises 288 lines and 352 columns, consequently 101 376 picture elements, chrominance data only being provided for every second picture element. When the video signal is structured in 8×8 blocks a total of 36×44=1584 blocks is obtained, whose geometrical position in an optically displayed video picture is unambiguously characterized by the data of an address. The same holds for the picture elements. Consequently the addresses are equivalent to the coordinate data. The notions marking, characterization or selection of blocks, picture element quantifies or specific picture elements (for example "centres of gravity" mentioned below) in the sequel of this description must always be understood to mean that this procedure is effected by additional data added to the addresses of these magnitudes, which are then together stored in stores—which are usually not expressly stated. Also clock pulses for clocked components, clock and further control lines are not explicitly mentioned, since a person skilled in the an undoubtedly recognizes their necessity and can include them when necessary.

Figure 2:
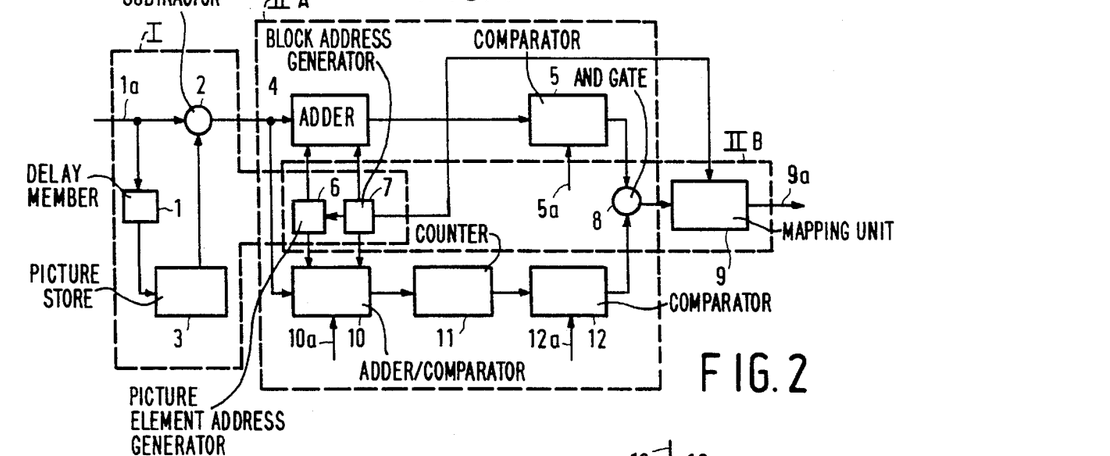
FIG. 2 shows a portion of the overall arrangement for determining what is commonly referred to as the status picture.

In addition, the unit I—as shown more accurately in FIG. 2—forms with the aid of a delay member 1, a picture store 3 and a subtractor 2 the difference between the picture element data of two consecutive video pictures, denoted difference picture for short. Structuring into blocks is effected by means of a block address generator 7 and addressing the picture elements of a block is effected by means of a picture element address generator 6, which is coupled to the block address generator 7. The difference picture can now be excited block-wise and picture element-wise by using the address generators 6 and 7.

The unit IIA is the comparator which first determines in subtractor 2 the difference value for each pair of picture elements of a block of two consecutive video pictures. In the present example, the difference value itself is chosen as the "standard value" of the difference picture; other standard values might, for example, be integral powers of the difference value. The standard values are added together, the sum of all the picture elements of a block being taken and the value of this sum being compared to a first threshold T1. Details are again shown in FIG. 2, more specifically in the section having the reference IIA. The adder unit 4 takes the sum of the standard values of picture elements, the comparator unit 5 compares the sum value to the threshold T1 and supplies a binary one when this sum value is above the threshold T1. In the example the threshold T1 has the value 10. This threshold value depends on the type of camera used and—as also holds for the further thresholds—is a parameter of the overall system, which in individual cases must be optimized. In the example a commercially available CCD-camera is used.

The adder/comparator unit 10 of the higher-order unit IIA forms the amount of picture elements of a block, and compares this amount immediately to a second threshold $T_2$, which has the value 4. If the value of this picture element exceeds the threshold T2, a counter 11 is incremented by a pulse from the unit 10. The counting position of this counter is applied to a comparator unit 12, which likewise supplies a binary one, when the counter 11 exceeds the position 40. The values of the thresholds are applied to the units 5, 10 and 12 via lines 5a, 10a and 12a.

The output signals of the units 5 and 12 are combined by an AND-gate 8 the output signal of which is transferred to a mapping unit 9 of the higher-order unit IIB of the respective FIGS. 1 and 2.

This unit 9 maps the 1584 blocks of a difference picture onto individual bits—designated status bits here—, i.e. in the unit 9 a binary one (first binary value) is stored under the address of a block, when the output signal of the AND-gate 8 assumes this value. In the other case a binary zero (second binary value) is stored. The status bits are conveyed further over a line 9a.

The totality of status bits of the blocks of a difference picture is here denoted status picture. The distribution of ones in the status picture indicates in which places (such a place is fixed by the indication of the block address with an accuracy of one block size) of two consecutive video pictures significant changes have occurred. The cause of such changes are moving objects, noise or suddenly changing light factors in the scenes recorded with the camera. As in the present case however a human face—or above all a head-shoulder scene—must be looked for, changes which are not based on head and shoulder movements are of no interest. They are removed as much as possible from the status picture by means of filters. In FIG. 1 these filters form part of the unit IIB. These filters have for their effect to invert status bits of the status picture chosen in accordance with predetermined criteria.

Figure 3:
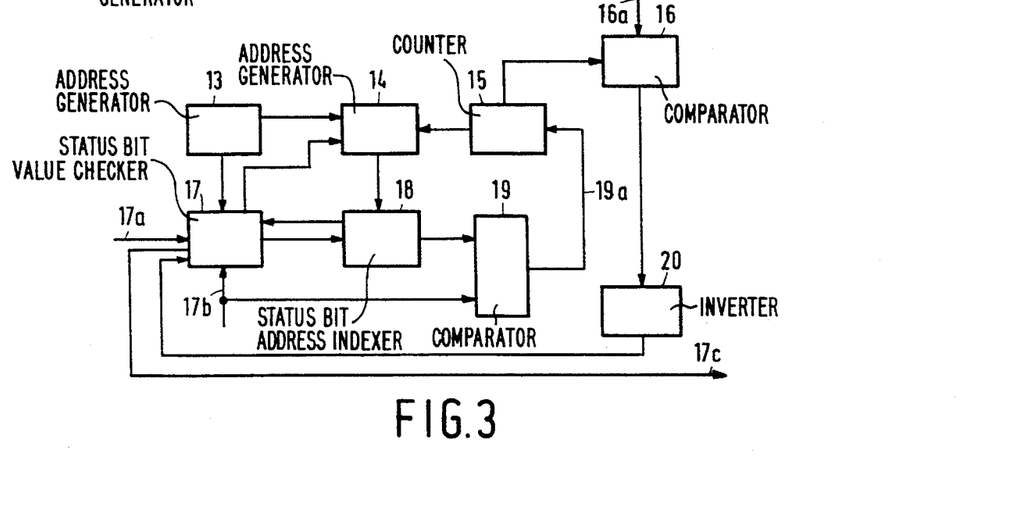
FIG. 3 to FIG. 5 show filters for filtering the status picture.

FIG. 3 shows an area filter, by means of which ones in the status picture are eliminated by inversion, when these area portions are not large enough. The status bits are applied via an output line 9a of the unit IIB to a unit 17 via a line 17a. The block addresses which are identical to the addresses of those status bits onto which the blocks were mapped, are generated by an address generator 13. The unit 17 then checks whether the status bits stored in its stores have the value 1 or not. If the answer is positive for a current status bit, a unit 14 generates an address from the eight status bits adjacent to this current status bit, conveys this address to a unit 18 which subsequent thereto takes the associated status bit from the unit 17 and applies it to a unit 19. The unit 19 compares the value of this status bit to the value 1 (this value is present on a line 17b) and in the positive case increments a counter of a unit 15 by one unit via a line 19a. Thereafter the unit 15 applies a pulse to the unit 14 for the generation of the subsequent neighbouring address. If after the values of all the status bits adjacent to the first status bit have been checked the counting position of the counter of the unit 15 does not exceed three, then a comparator 16 conveys a signal to a unit 20 which inverts the current status bit in the unit 17. In all other cases the bits are transferred without having been inverted. The bounding integer having the value 3 is applied to the comparator 16 via a line 16a. After processing of the overall status picture the status bits are conveyed further via a line 17c.

Figure 4:
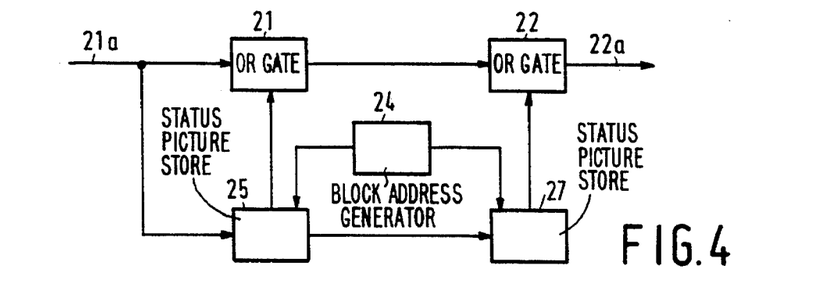

A further filtration of the status pictures is effected using the smoothing arrangement of FIG. 4, since the output line 17c is connected to an input line 21a. The smoothing arrangement is comprised of a first status picture store 25, as well as a subsequent second status picture store 27.

Both status picture stores 25 and 27 are driven by a block address generator 24, which reads from both stores the status bits of two consecutive status pictures, which have the same addresses. The status bits read from the store 25 are applied to an input of an OR-gate 21 and the status bits read from the store 27 are applied to an input of an OR-gate 22. The non-delayed status bits are applied to the second input of the gate 21, whose output is connected to the second input of the gate 22. The status bits of the status picture smoothed in the above-described manner are transferred via an output line 22a.

Corresponding status bits (i.e. status bits having the same address) of three consecutive status pictures are logically combined by an OR operation of the OR-gates 21 and 22. This OR-operation eliminates statistic fluctuations, which become noticeable in consecutive status pictures from a different distribution of zeros and ones, to promote a uniform distribution of ones.

Figure 5:
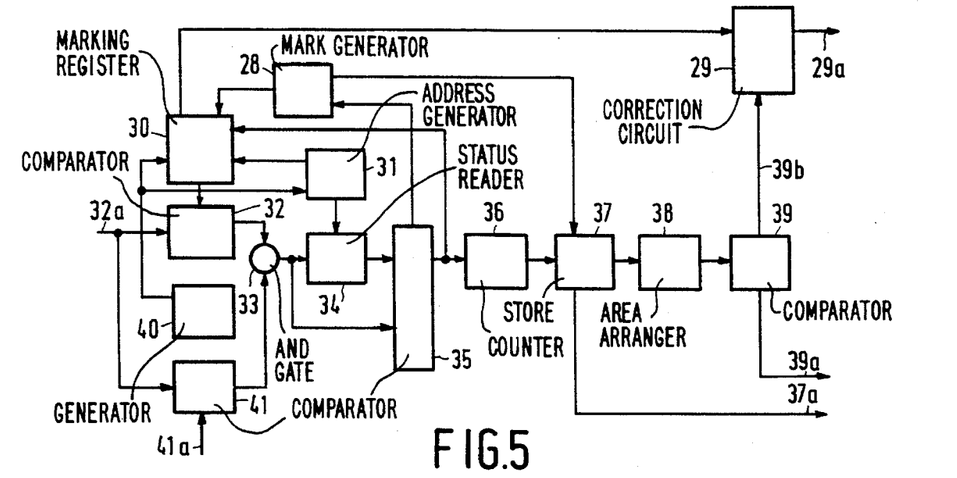

A further filtration of the status pictures is effected by the filter circuit shown in FIG. 5. The circuit counts the associated regions of ones, which occur in a status picture, and determines their size. With the object of later identification a marker figure is assigned to each area. If there are more than two of these areas, their size ratios are checked. If the second largest area has a size which exceeds 20% of the size of the largest area, it is assumed that the status picture cannot contain a silhouet, as is shown in, for example, FIG. 10. An encoder (not shown) connected to the system then receives the message that henceforth a standard coding must be used.

In FIG. 5 a marking register 30 is shown, in which area marks generated by a generator 40 are to be stored under status bit addresses, that is to say, in the course of the analysis, a figure which indicates the number (starting at one) of the area to which a picture element of a status picture belongs is stored under each address. At the beginning of the analysis of a status picture all the storage locations of the marking register 30 are overwritten by the value 0. The status bits whose addresses are generated by the generator 40 are applied to two comparator circuits 32 and 41 via a line 32a. The comparator circuit 41 checks whether a one is involved in the status bit and the comparator circuit 32 checks whether the associated location (address) has not yet been marked. If a one is involved, and the location has not yet been marked, both circuits supply a one from their outputs which are combined by an AND-gate 33. The output of the gate 33 is connected to a unit 34 which from a unit 31 receives the current address (which was just generated by the unit 40), and also all its adjacent addresses.

If the output signal of the AND-gate 33 has the value one, the unit 34 reads from a status store not shown in FIG. 5, all the status bits whose addresses it has received from the unit 31. The associated status bits are then applied to a comparator 35, one input of which is connected to the output of the AND-gate 33 and which compares the values of these status bits to the value of the current status bits.

The addresses generated by the unit 31 are also applied to the marking register. If one of the status bits associated with these addresses has the value 1, which means that an output signal of the comparator 35 has the value one, then the area mark generated by a mark generator 28 is stored at these addresses.

If all the status bits which are adjacent to the current status bit and have not yet been marked have the value 0, then the comparator 35 applies a signal to the mark generator 28 which thereafter increments the area mark by one unit, as in this case there are no more status bits associated with the areas determined so far.

A counter 36, coupled to the comparator 35, counts the ones belonging to the area just determined. The total number of the ones belonging to an area (size of this area) are stored together with the area mark supplied by the mark generator 28 in the store 37 and are made available to all the subsequent units via a line 37a. After all the picture elements of the status picture have been determined once, a unit 38 arranges the determined areas according to their size. A subsequent comparator 39 determines whether the second largest area exceeds 0.2 time the size of the largest area. If so, a signal is applied via a line 39a to an encoder, not shown, which then starts the standard encoding operation. If the check is negative, the mark figure of the largest area is applied to a correction circuit 29 via a line 39b. This correction circuit 28 then reads the content of the marker register 30, replaces the marks corresponding to the mark of the largest area by one and all the other marks by zero. The status picture thus filtered is transferred bit-sequentially via a line 29a to subsequent units for further processing.

Figure 6:
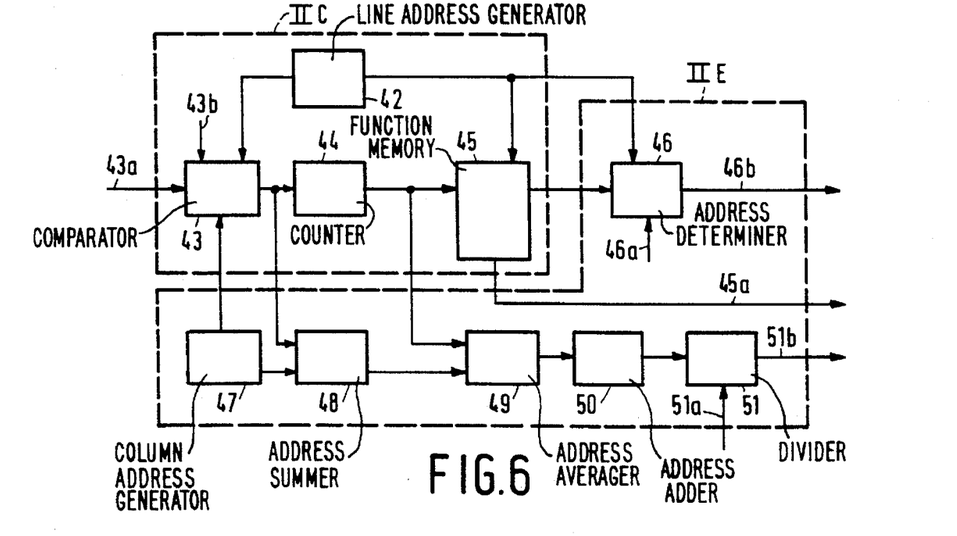
FIG. 6 shows a portion of the total arrangement for determining what is called a feature function and for determining the centre axis of the objects shown in the status picture.

After the generation of a status picture from which interferences have been removed to a large extent and in which the presence of a face can be assumed, this picture is transformed by a unit IIC of FIG. 1 into a unidimensional feature function. In the example the number of status bits having the value 1 within each of the line is determined. This number, being a function of the line number, starting at the first (top) line up to the $36^{th}$ (bottom) line, represents the feature function Mf(k), wherein k=1,2 . . . 36. The components within the box IIC in FIG. 6 are used to determine this function. The line addresses (line numbers) are generated by a generator 42, the column addresses which indicate the location of a status bit within a line, are generated by a generator 47. A unit 43 to which a binary one is applied via a line 43b for the purpose of comparison, receives via a line 43a that status bit that is associated with the total address generated by the generators 42 and 47. It compares the arrival of the status bit of a line to a binary value supplied via line 43b and, when there is agreement, applies a counting pulse to a subsequent counter 44. At the end of a line the counting position is stored at the line address in a function memory 45. The totality of the storage content represents the feature function. It is transferred via a line 45a.

Figure 10:
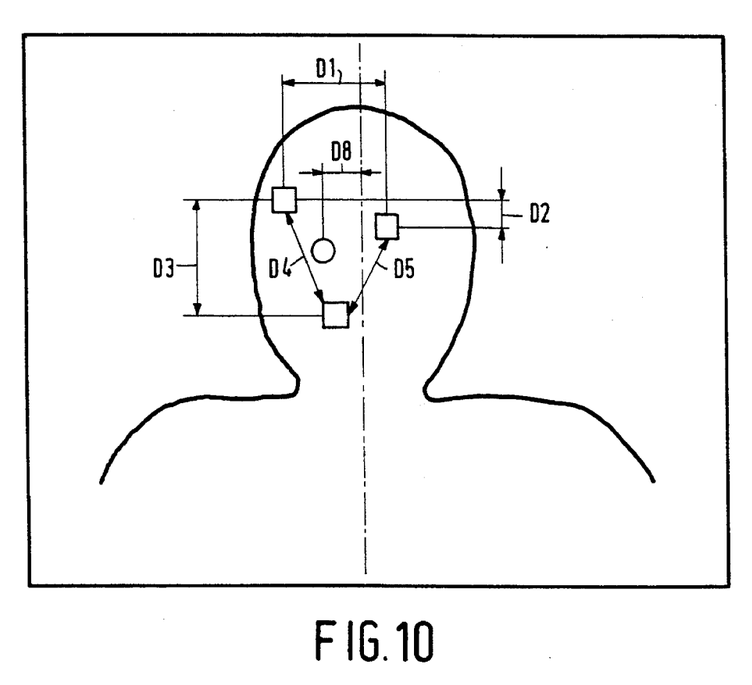

The unit IIE shown in FIG. 1 determines the centre of gravity or centre point of the ones of a line, that is to say that address that is obtained after the arithmetical mean of all the addresses of a line has been formed at which a binary one has been stored in the status picture. These data are required later on for the following purposes:

For the determination of a centre axis (substantially the symmetry axis), of a silhouet as shown in FIG. 10 and for the determination of the uppermost point of the head.

If, namely, during the determination of the centre of gravity the address 0 is assigned to the centre of gravity for all the lines not containing ones, then the uppermost point of a head is obtained as the uppermost centre of gravity having an address differing from zero.

The column- addresses of the generator 47 are entered into a unit 48 when the output of the unit 43 indicates that a binary one is stored under the total address. The unit 48 forms the sum of all the entered addresses, conveys this sum to a unit 49 which contains the number of terms of the sum from counter 44 and forms an average address from both quantities, which here is denoted the centre of gravity of a line. The centre of gravity addresses are added together in a unit 50 and divided by a unit 51 by the number of sum terms applied to the unit 51 via a line 51a. The result is the horizontal address of the centre axis looked for, which extends perpendicularly to the status picture. The data of the horizontal address (coordinate) consequently characterizes the centre axis unambiguously. This data is further conveyed via a line 51b.

The coordinates of the uppermost point of the head are derived similar to the data obtained above—from the feature function. The horizontal address of this point is identical to the horizontal address of the centre axis and its vertical address is the first line address after which the feature function assumes a value differing from zero. This address is determined by a unit 46, which receives the comparator zero via a line 46a. The result is conveyed further via a line 46b.

Any noise peaks in the feature function which are transferred via the line 45a and a line 52a, are removed by a median filter 52. From always three consecutive values the median filter replaces the second function value by a value located between the lowest and the highest of all the three function values.

The standardized feature function is convoluted by a unit IID shown in FIG. 1 with an auxiliary function h, i.e. the sum proportional to the convolution integral $$\sum_{i=1}^{288} Mf(i) \times h(i) \quad (1)$$

is formed. The auxiliary function h has been "trained" such that its value of the convolution integral with feature function samples, not further described here, assumes the value 1 and for certain other samples assumes the value −1. The convolution integral assumes the value −1 for samples which are the least similar to the silhouet shown in FIG. 10, and the value 1 when the similarity is at its greatest.

Figure 7:
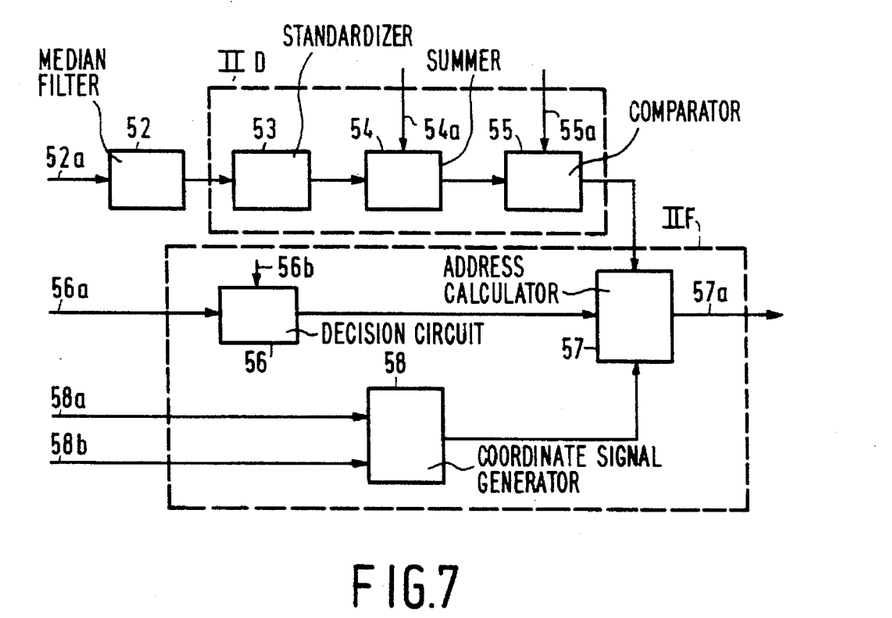
FIG. 7 shows a portion of the overall arrangement for the convolution of the feature function and for positioning a rectangular face area in the region of the face assumed to be present in the status picture.

FIG. 7 is a more detailed representation of the function block IID. A unit 53 standardizes the feature function, that is to say in the example it divides all the values by its maximum, so that the values of the standardized function are located between zero and one. The subsequent unit 54 forms the sum indicated in the line of formula (1), the values of the auxiliary function h being applied to the unit 54 via a line 54a. A comparator 55 compares the sum value to a threshold on a line 55a. The threshold value 0.75 was found to be advantageous. If the sum value is less than 0.75, the analysis is interrupted. In the other case a comparator 55 applies a signal to a unit 57 which with the aid of its input signals calculates the addresses of a rectangular region (face area), in which the face could be located. The output signal of a unit 56, which decides about the size of the rectangle to be marked, belongs to the input signals of the unit 57. On the basis of 8×8-blocks, the following three sizes of the rectangles proved to be sufficient: 8×12, 12×18 and 16×24. The numbers indicate address differences, so paths in units of the length of the sides of a 8×8-block. The unit 57 calculates the addresses of those areas in the video picture that correspond to the face area.

The unit 56 chooses one of these two sizes. As an auxiliary means it has at its disposal the output signal of the unit 37. The three sizes are applied to the unit 56 via a line 56b. Included in the further input data of the unit 57 is the output signal of a unit 58 which receives the vertical coordinates of the topmost head point from the unit 46 over a line 58a and the coordinates of the vertical centre axis over a line 58b. The line 58a is connected to the line 46b, whilst the line 58b is connected to the line 51b. On the basis of these two indications and with the indication about the size of the rectangle, the unit 58 calculates the coordinate of the left-hand upper corner of this rectangle and conveys this coordinate to the unit 57. This terminates the coarse identification of the human face. The coordinates of the points of this rectangle are applied for a fine identification to a unit IIG of FIG. 1, over a line 57a.

Figure 8:
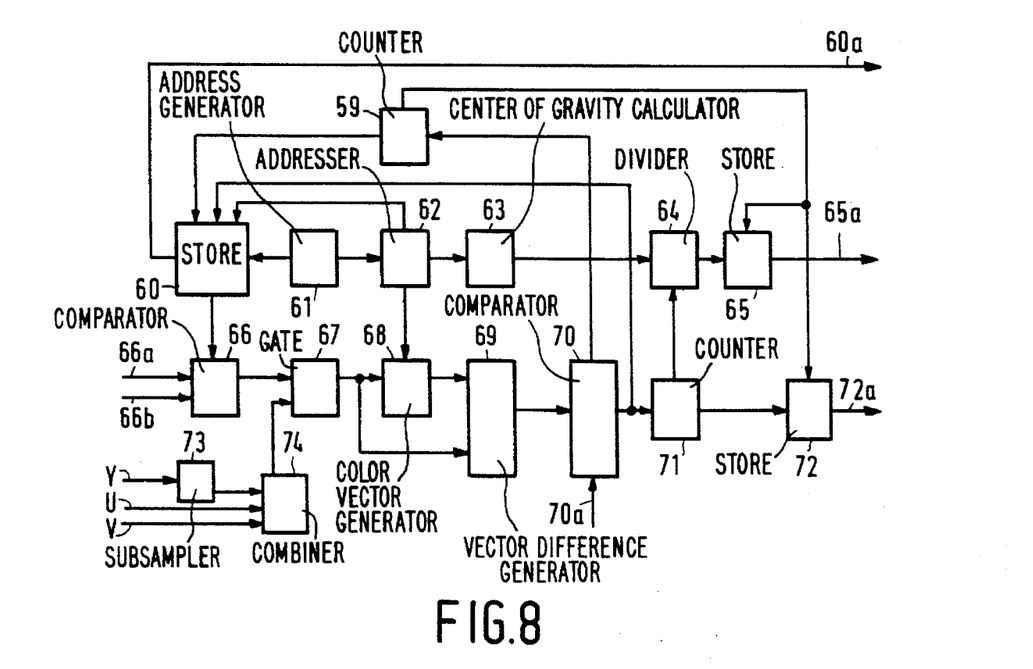
FIG. 8 shows a portion of the overall arrangement for dividing a colour video picture into regions having different chrominance values.

Using the unit IIG the video picture portion (here the original video picture present on the input line IA of FIG. 1) which corresponds to the face areas is divided into a consecutively numbered number of regions. These regions—mathematically speaking simple associated quantities of picture elements—are detected by checking picture-sequentially in which class of picture element data a picture element is included. The picture element data, consisting of luminance values Y and chrominance values U, V, are divided into classes by dividing the three-dimensional space of the vectors (Y, U, V) into separate quantities of picture elements, for example cubes, and all the picture elements whose vectors (Y, U, V) are included in a given cube, belong to the same class. Starting point is the upper left-hand picture element, which belongs to class 1. Thereafter the neighbouring picture elements are checked, to see whether they also belong to class 1, etc., until a simple coherent quantity of picture elements is obtained, which all belong to this class. Then a picture element is investigated in detail, which belongs to the second class and which is processed in exactly the same manner as the first picture element. All this will be explained in greater detail with reference to FIG. 8. In FIG. 8 a unit 74 combines the picture element data Y, U, V into vectors. The luminance values Y have previously been sub-sampled by a unit 74, to provide that all the three data are adapted to one uniform clock. An index store 60, in which all the picture elements of the video picture belonging to the same region are provided with the same index, is set to zero before the beginning of the analysis of a picture. The addresses of the current picture element are generated by an address generator 61 and the corresponding index (zero at the start) is compared, using a comparator 66, to zero. The comparison zero is applied to the comparator 66 via a line 66a. If the picture element has not been provided with an index, which means that the index read still has zero value, and the picture element is associated with that part of the picture area that corresponds to the face area, then the output signal of the comparator 66 opens the gate 67, in response to which the colour vector (Y, U, V) of the current picture element, which vector was supplied by the unit 74, is conveyed to the units 68 and 69. The addresses of the areas corresponding to the face areas are applied to the unit 66 via a line 66b, which is connected to the line 57a. The number of addresses of the eight picture elements adjacent to said picture element are also transferred to the unit 68, which in response thereto produces the associated colour vectors. The difference of the colour vectors between the current picture element and its neighbouring elements is formed by the unit 69. Difference should here be understood to mean the square of the difference vectors, wherein however the individual components of this vector have not been weighted. The weighting factors used are 0.2 for the Y-component and 1 for the two other components. This weighting operation reduces the influence of shadows during the division of the video picture into regions.

The difference produced by the unit 69 is then compared by a unit 70 to a threshold T, which is applied to the unit 70 via a line 70a. The unit 70 then decides whether the environment of the current picture elements still belongs to the same region as it does itself. The subsequent counter 71 counts the number of picture elements belonging to a region and indicates thereby the size of this region. This size is stored in a store 72, more specifically in combination with the number (index) of this region, which is also applied to the store 72 by a counter 59. The sizes of the area are conveyed further via a line 72a. The counter 59 cycles through the regions. The counter 59 is incremented by one unit, when the comparator 70 indicates by means of a pulse that no neighbouring picture elements of the current picture element belong to the same region anymore. When a neighbouring element has been found, belonging to the same region as the current picture element, its region number (index) is stored by a counter 59 in the store 60 under its address, which is also applied to the store 60 by the unit 62.

The addresses produced by the unit 62 are added together in the unit 63 to calculate the centre of gravity of this region. The sum of the addresses of a region are then divided by a divider 64 by the number of picture elements of this region. The divider 64 receives the number of picture elements from the unit 71. This centre of gravity is then stored in the store 65 together with the corresponding region number (index) for further use. After each picture element has been determined once, the store 60 contains a division of all the picture elements into regions whose numbers are made available via a line 60a. The results of the division into regions, namely the size of the regions, the centre of gravity of the regions and the assigning of a picture element to a numbered region are further processed by a subsequent unit IIH. With this unit IIH it is endeavoured to find three regions which correspond to the eyes and the mouth of a human face. As has been described already in the foregoing, the investigation is limited to those regions that are located within the face area which was determined by the coarse identification.

Figure 9:
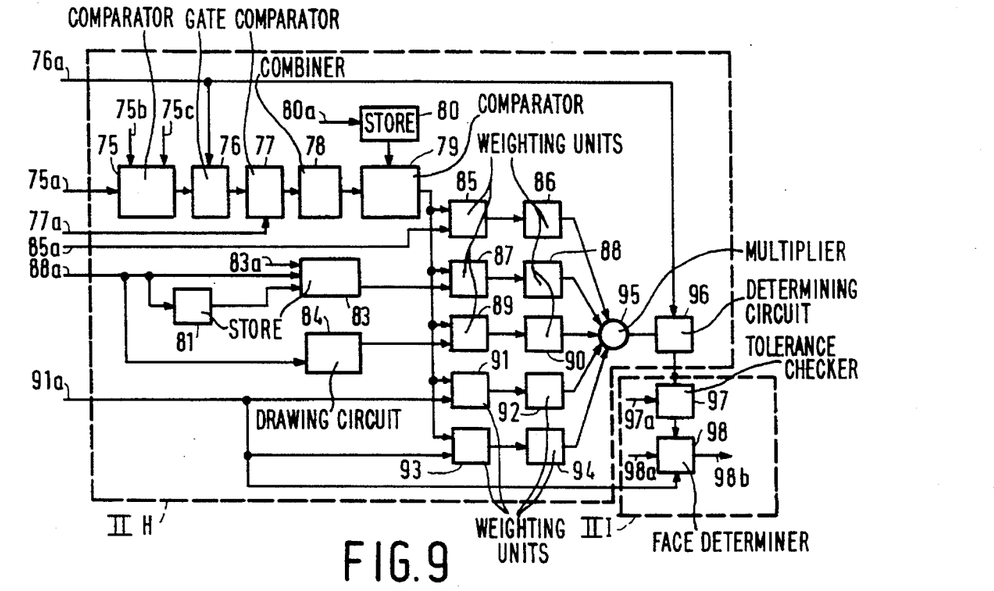
FIG. 9 shows a portion of the overall arrangement for searching eye and mouth areas of a human being and FIG. 10 is a silhouette of the head and shoulder portion of a human being to illustrate the geometrical ratios between eyes and mouth.

The centres of gravity located in the face area are combined to form triplets and it is then determined whether these triplets can correspond to the eyes and the mouth of a human face on the basis of their geometrical position. This check consequently utilizes the geometrical ratios between the eyes and mouth of a human face. The length ratios of the connections of a triplet are, for example, determined and then it is checked whether these length ratios correspond to reference data of eyes and mouth of a person. Finally it is checked how the coordinates of all the three points of a triplet are positioned relative to the previously determined centre axis. A triplet in which the presumed eyes do not have approximately the same horizontal addresses, cannot be the eyes of a human being. Finally, the unit IIH also checks whether the difference in colour between those regions in which the two eyes should be located, is not too large and consequently cannot correspond to the eyes of a human being. Furthermore it is investigated whether those regions which must belong to the eyes and the mouth, have a greater degree of motion than other regions. Finally all these properties are weighted, using a severity code, and from all the triplets determined so far the triplet located in the optimum of all the weighting operations is selected. FIG. 9 shows the unit IIH in detail.

The area sizes stored in the store 72 are applied to a comparator unit 75 via a line 75a which is connected to the line 72a. The comparator unit compares these sizes to a lower and an upper threshold applied to this unit via the lines 75b and 75c. Using the comparator unit it is checked whether the area sizes stored in the store 72 can approximately correspond to the areas of the eyes and the mouth of a human. An area located between these two thresholds might contain a human eye or a mouth. Typical values for the thresholds are five for the lower and thirty for the upper threshold. The gate 76 opened by the comparator 75 as soon as the size of a area is located between the two thresholds, conveys the centre of gravity coordinates of this region, transferrred over a line 76a, to a comparator 77. The line 76a is connected to the line 65a. The comparator 77 checks whether the centre of gravity coordinates are located within the previously determined face areas, whose characteristic data are fed forward over a line 77a. Only regions located within these areas are processed further. A unit 78 combines all the centre of gravity coordinates located within these areas into triplets, which may correspond to the eyes and the mouth of a human face. Each of these triplets can be compared by a comparator 79 to reference data stored in a store 80. These reference data are obtained from an a priori knowledge of the human face and from the parameters obtained from the analysis of the status picture. The analysis data are applied to the unit 80 over a line 80a which is connected to the line 57a. The reference parameters include the distance between the eyes, the distances D4 and D5 between eyes and mouth, the vertical distance D2 between the eyes, the horizontal distance D1 between the eyes and the distance between the vertical axis and the colour region (cf. FIG. 10). The accepted triplets are then further conveyed to units 85 to 93, which assign weighting factors to each of these triplets, in accordance with the comparison to further properties specified hereinafter.

The unit 85 calculates and stores the centre of gravity of a triplet and its distance from the centre axis. The data of the centre axis are applied to the unit 85 via a line 85a, which is connected to the line 51b. The unit 87 calculates the total energy of the difference picture within the plane of the regions belonging a triplet. This difference picture is formed and stored in the unit 83. To that end the current video picture is applied to this unit over a line 81a, and the preceding picture stored in a store 81 is also applied to this unit. Calculating the energy is only effected within the face areas whose boundary data are applied to the unit 83 via a line 83a. The line 83a is connected to the line 67a. The analysis is based on the fact that the eyes and mouth are face regions which move often and fast. A unit 89 provides indications about the symmetry ratios in the vicinity of the picture element of an accepted triplet. This vicinity indication is applied to a unit 84 via a line 84a. The unit 84 draws a rectangle around the centre of gravity of the presumed eyes or the presumed mouth and examines in how far this region is mirror-symmetrical to a horizontal symmetry axis. A measure of this symmetry is the sum of the differences of all the data between original points and mirrored points, divided by the variances. Areas, such as eyes and mouth, having a highly symmetrical structure, then have a low symmetry value compared to non-symmetrical areas or areas without structure. This symmetry measure—calculated by the unit 84—is employed in the unit 89 to calculate also a weighting factor for the current triplet. The unit 91 calculates a weighting factor representing the similarity between the colours of the eye regions. This unit receives the chrominance values of the eye regions via a line 91a, which is connected to the line 60a, which valuea are stored in the store 60. Only those triplets in which the areas which are to correspond to the eyes, have the same colour, will be weighted most.

The unit 93 generates weighting factors with which the coloured surroundings of the eyes and the mouth are weighted. The colour of this surrounding area is also applied to the unit 93 from the store 60. Triplets which might be eyes and mouth, must have the same coloured surroundings. The smaller the colour differences of the surroundings are, the higher is the weighting factor with which a triplet is weighted by the unit 93. The weighting factors of all the triplets accepted so far, stored in the units 85, 87, 89, 91 and 93, are transferred to standardizing units 86, 88, 90, 92 and 94 and standardized such that their values are between zero and one. They are then multiplied by each other, more specifically by a unit 95. From the stored values, a unit 96 determines that triplet for which these values have a maximum. It stores the associated coordinates and applies them to the unit denoted by II-I in FIG. 1. The unit II-I is shown in greater detail in FIG. 9. In the unit 97 it is checked whether two interrelated, optimal triplets are in agreement or not in agreement within given tolerance limits, which limits are applied to the unit 97 via a line 97a. If they are in agreement, the data are conveyed to a unit 98, and the reference data, supplied with these data via a line 98a, of those picture elements of the picture that might belong to the face of a human being are determined. The coordinates of these picture elements are passed on to an encoder, not shown, over a line 98b. In the manner described a finer, improved area of the video picture is determined, in which a human face is present with a very high degree of probability.

I claim:

1. A circuit arrangement for recognizing a human face in a sequence of video pictures, each picture comprising a plurality of picture elements, wherein said sequence of video pictures is structured into blocks of said picture elements, respective blocks of two consecutive video pictures are subtracted from one another so as to form a difference picture comprising a plurality of difference blocks each comprising a plurality of picture elements each having a standard value, said standard values of said difference picture elements of each of said difference picture blocks are summed so as to form respective standard value sums, and said difference picture is mapped onto a status picture formed by status bits by comparing the standard value sum of each of said difference blocks to at least one threshold value and mapping those of said difference blocks having a standard value sum exceeding said at least one threshold value onto a status bit having a first binary value, and mapping those of said difference blocks having a standard value sum not exceeding said at least one threshold onto a status bit having a second binary value which is inverse to said first binary value, said circuit arrangement comprising:

a) transforming means for transforming a first area of said status picture comprising first status bits having said first binary value into a unidimensional feature function in such a manner that the total number of these status bits within a line or a column of the status picture is determined;

b) convolution means for standardizing said unidimensional feature function by convoluting said feature function with a second function so as to form a convolution integral and to supply a recognition signal when said current convolution integral corresponds to ideal values within predetermined tolerance limits; and c) marking means for determining, when said recognition signal is present, the center point of each line of said first area of said status picture so as to determine a vertical center axis, and to mark a plurality of points of said status picture located within a predetermined face area, which is cut in half by said center axis.

2. A circuit arrangement as claimed in claim 1, wherein first filter means are provided, to change the status picture such that a status bit having the first binary value is inverted when the number of adjacent status bits having the same binary value is below a predetermined threshold.

3. A circuit arrangement as claimed in claim 1, further comprising:

smoothing means for changing the status picture such that corresponding status bits of at least two consecutive pictures are combined into one new status bit by a logic OR- combining operation.

4. A circuit arrangement as claimed in claim 1, further comprising: second filter means for changing the status bit.

5. A circuit arrangement as claimed in claim 1, further comprising:

median-filter means for smoothing a one-dimensional feature function by means of a median filtering.

6. A circuit arrangement as claimed in claim 1, further comprising:

means provided for dividing the areas of a video picture corresponding to face areas into a consecutively numbered number of regions wherein 6a) the picture elements of a region are all included in the same class of picture data, and which are provided for, 6b) determining the size and the centres of gravity of these regions.

7. A circuit arrangement as claimed in claim 6, further comprising:

means for:

determining the distance of a triplet from centres of gravity.

8. A circuit arrangement as claimed in claim 7, further comprising:

means for checking at least two consecutively determined optimum triplets to see whether they agree within predetermined tolerance limits, and if there is agreement, for determining all those picture elements which according to reference data belong to a human face.

* * * * *